United States Patent

[11] 3,580,206

| [72] | Inventor | William R. Duncan<br>Rte 3, Box 249, Sequim, Wash. 98382 |
|---|---|---|
| [21] | Appl. No. | 806,105 |
| [22] | Filed | Mar. 11, 1969 |
| [45] | Patented | May 25, 1971 |

[54] AUTOMATIC PILOT
8 Claims, 11 Drawing Figs.

[52] U.S. Cl. ............................................. 114/144,
114/151, 137/81.5
[51] Int. Cl. ........................................... B63h 25/00
[50] Field of Search ................................. 114/144,
151; 137/81.5

[56] References Cited
UNITED STATES PATENTS
3,247,667  4/1966  Adam's et al. ............... 114/151X

| 3,496,526 | 2/1970 | Rockwell .......................... | 137/81.5X |
| 3,148,654 | 7/1962 | Wallace et al. .................... | 114/144 |
| 3,259,096 | 7/1966 | Bowles ............................. | 114/151 |

*Primary Examiner*—Andrew H. Farrell
*Attorneys*—Clarence A. O'Brien and Harvey B. Jacobson ABSTRACT: A compass-controlled valve continuously regulates differential, atmospheric venting of opposite lateral sides of a venturi throat in a flow passage extending through a rudder which directionally controls movement of a craft. The dynamic pressure of a flow stream through the rudder passage is thereby controlled to directionally drive a turbine wheel geared to the pivot shaft of the rudder for corrective angular movement of the rudder, reestablishing the craft heading corresponding to the adjustable setting of the compass-controlled valve.

Patented May 25, 1971

William R. Duncan
INVENTOR.

BY Clarence A. O'Brien
and Harvey B. Jacobson
Attorneys

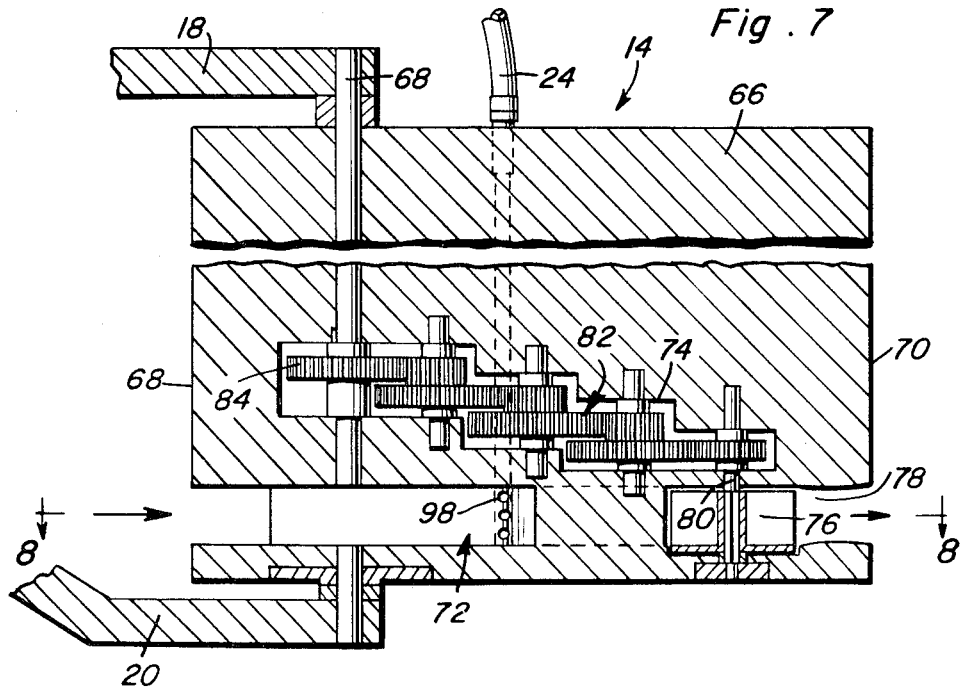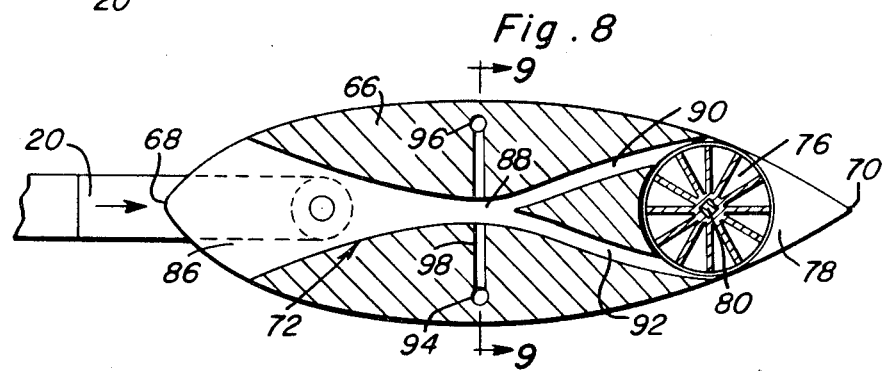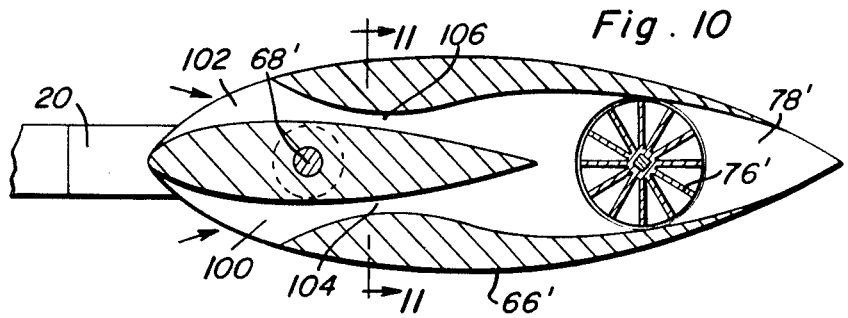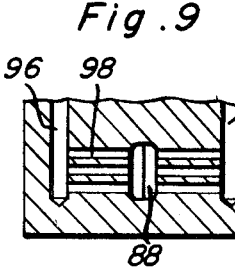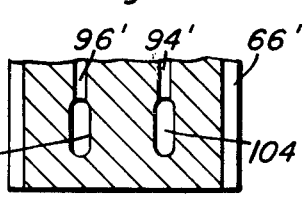

AUTOMATIC PILOT

This invention relates to automatic steering controls for marine craft or the like.

Automatic pilot devices for maintaining a preset direction in which a craft is propelled, are well known. Such automatic pilot devices often utilize a source of fluid under pressure carried by the craft in order to furnish a motivating medium for a rudder-positioning servomotor and sometimes utilize a compass-controlled fluid distribution system through which intermittent correction signals are generated to directionally control actuation of the servomotor in order to maintain the directional heading of the craft.

An important object of the present invention is to provide an automatic pilot device for maintaining the directional heading of a craft without reliance upon a source of activating fluid stored in the craft. A further object is to provide a continuous compass-derived signal to regulate operation of a rudder-positioning device actuated by the fluid medium through which the craft is propelled.

In accordance with the present invention, a magnetic compass rotor is formed with a valve passage through which a pair of venting tubes are differentially connected to atmosphere in order to controllably introduce air to opposite lateral sides of a venturi throat portion of a flow passage extending through the directional controlling rudder of a craft being propelled through a fluid medium such as water. The flow stream of water conducted through the rudder passage is affected by the amount of air introduced as well as the lateral direction from which the air enters in order to directionally control rotation of a turbine wheel located in the exit portion of the rudder passage. The turbine wheel is geared through a high reduction gear train to the pivotal mounting shaft of the rudder so as to produce corrective angular displacement of the rudder in response to rotation of the turbine wheel.

In one embodiment of the invention, the rudder passage arrangement includes a pair of channels diverging in a downstream direction from the venturi throat portion at which a suction pressure is developed as water is conducted through the rudder passage during movement of the craft on which the rudder is mounted. The suction pressure developed induces inflow of air from opposite lateral sides of the flow stream through orifice passages. Fluid communication between the orifice passages and atmosphere is differentially controlled in order to disrupt surface adherence between the flow stream and one of the diverging channels through which it is conducted to cause switching of the flow stream from one channel to another. This method of switching the flow stream from one channel to another is analogous to but considerably different from the signal pressure pulse method of switching fluid streams in fluidic bistable amplifiers.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 7 is an enlarged side sectional view taken substantially through a plane indicated by section line 7-7 in FIG. 2.

FIG. 8 is a sectional view taken substantially through a plane indicated by section line 8-8 in FIG. 7.

FIG. 9 is a partial transverse sectional view taken substantially through a plane indicated by section line 9-9 in FIG. 8.

FIG. 10 is a sectional view similar to FIG. 8 but showing a modification.

FIG. 11 is a partial transverse sectional view taken substantially through a plane indicated by section line 11-11 in FIG. 10.

Figure 1:
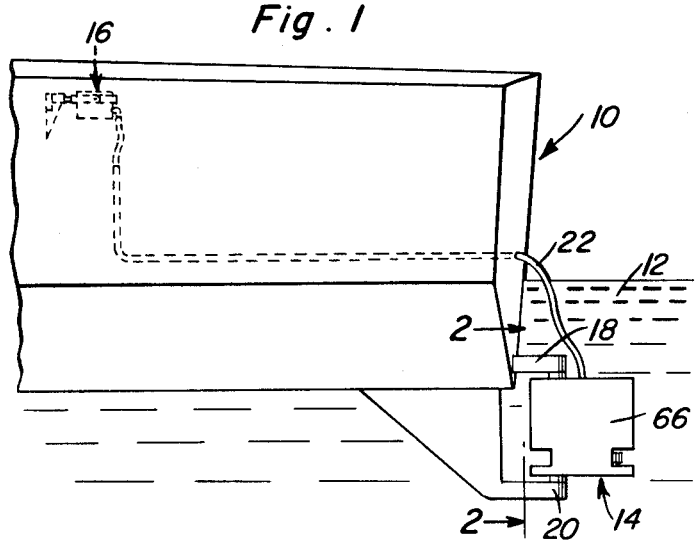
FIG. 1 is a partial side elevational view of a marine craft employing the automatic pilot system of the present invention.
Figure 2:
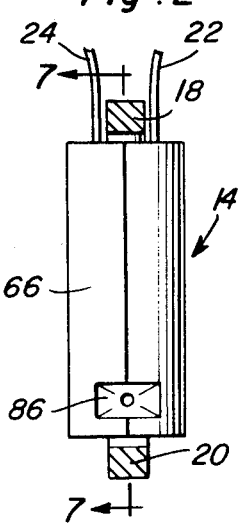
FIG. 2 is an enlarged partial sectional view taken substantially through a plane indicated by section line 2-2 in FIG. 1.

Referring now to the drawings in detail, FIG. 1 illustrates a craft such as a boat 10 adapted to be propelled through a fluid medium such as water 12. The directional course of the craft is controlled by the angular position of a rudder generally referred to by reference numeral 14, pivotally connected to the craft within the water 12. The rudder 14 is angularly displaced about a vertical axis relative to the craft in order to change or correct the directional heading thereof. Corrective angular displacement of the rudder is automatically controlled by means of a course-directing assembly 16 mounted at any suitable location on the craft as shown by dotted line in FIG. 1. By way of example only, the embodiment illustrated in FIGS. 1 and 2 shows the rudder pivotally mounted between upper and lower brackets 18 and 20 projecting rearwardly from the craft 10, the rudder being operatively connected to the course-directing component 16 through a pair of flexible, fluid signal-conducting conduits 22 and 24.

Referring now to FIGS. 3 through 6, the course-directing component 16 is mounted on the frame 26 of the craft by means of an outer bracket 28 horizontally positioning a supporting axis extending through a pair of pivot pins 30 that project through aligned openings in the bracket 28. The pivot pins 30 are mounted in 180°spaced apart relation on a gimbal ring 32 supporting a cylindrical casing 34 having a gravitationally positioned vertical axis intersecting the pivotal support axis which extends through the pivot pins 30. The casing 34 is closed at its lower end while its open upper end is closed by a transparent cover plate 36 secured by fasteners 38 to the casing, as more clearly shown in FIG. 4. The cover plate is provided with an externally knurled surface 40 radially overlapping the gimbal ring 32 so that the casing may be angularly displaced to an adjusted position about its vertical axis, the casing being frictionally held in its adjusted position by the gimbal ring 32.

Figure 3:
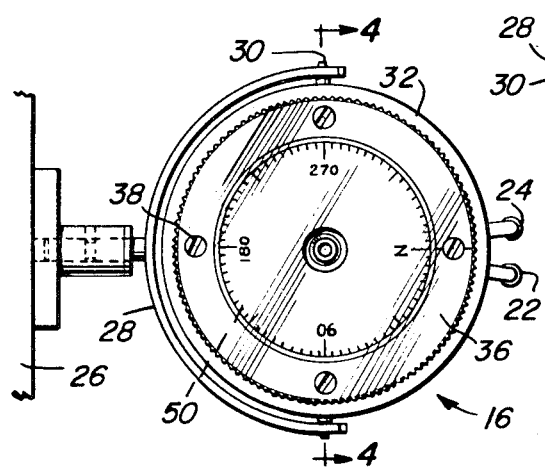
FIG. 3 is a top plan view of the course-directing component of the automatic pilot system of the present invention.
Figure 4:
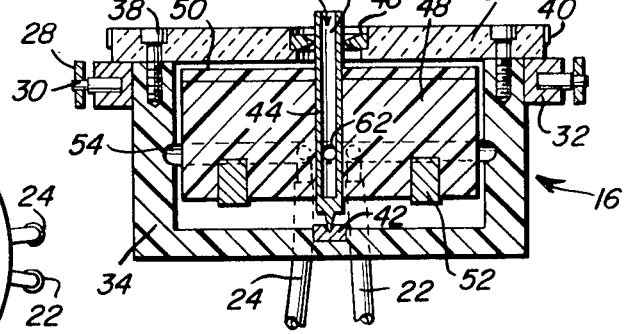
FIG. 4 is a sectional view taken substantially through a plane indicated by section line 4-4 in FIG. 3.

A bearing 42 is mounted within the bottom of the casing 34 as shown in FIG. 4 so as to support the lower end of a spindle 44 which projects upwardly through a bearing 46 centrally mounted within the transparent cover plate 36. A cylindrical rotor 48 is secured to the spindle for angular movement therewith about the vertical axis of the casing. Direction-indicating indicia is carried on the top surface 50 of the rotor and is visible through the top cover plate 36 as shown in FIG. 3 in order to provide an indication of the directional heading of the craft. The rotor 48 constitutes a magnetic compass and toward this end embeds a pair of permanent magnet bars 52 on either side of the spindle 44. Accordingly, the rotor 48 will assume a constant position relative to the earth because of the magnetic field of the earth in order to provide a reference direction. The casing 34 will therefore be angularly displaced relative to the rotor 48 in response to any change in direction of the craft 10 within which the casing 34 is mounted.

Figure 6:
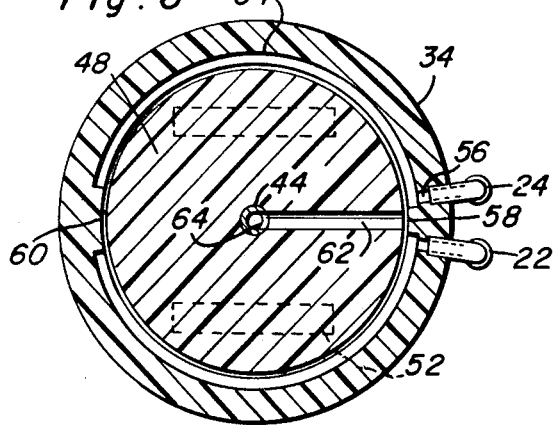
FIG. 6 is a top sectional view taken substantially through a plane indicated by section line 6-6 in FIG. 5.
Figure 5:
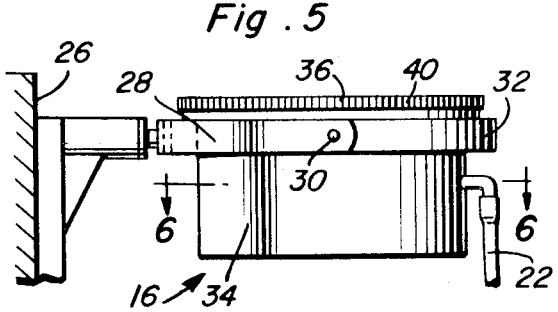
FIG. 5 is a side elevational view of the course-directing component illustrated in FIG. 3.

The rotor 48 in addition to forming a magnetic compass, cooperates with the casing to form a compass-controlled valve assembly differentially regulating the flow of air through the flexible conduits 22 and 24. The internal cylindrical wall of the casing is therefore structured so as to provide separate arcuate passages 54 in fluid communication with the flexible conduits 22 and 24 through ports 56 as more clearly seen in FIG. 6. The passages 54 are formed by grooves in the internal wall of the casing leaving portions 58 and 60 located 180° from each other. A radial clearance exists between the outer peripheral surface of the rotor 48 and the internal surface of the cylindrical casing wall to accommodate substantially frictionless rotation of the rotor relative to the casing. A radial passage 62 extends through the rotor from its outer peripheral surface to the spindle which is hollow so as to form an axial passage 64 open to atmosphere at the top as shown in FIG. 4. In the neutral flow-restricting position of the rotor relative to the casing as shown in FIG. 6, the end of the radial passage 62 at the peripheral surface of the rotor is aligned with the portion 58 between the grooved passages 54 so as to substantially block fluid communication between the passage 62 and the ports 56 to which the flexible conduits 22 and 24 are connected. In this position of the rotor, the flexible conduits will be restrictively vented to atmosphere by an equal amount. Angular displacement of the rotor in one direction or the other relative to the casing will then enlarge or increase the flow of air or venting of one of the flexible conduits relative to the other. Thus, angular displacement of the rotor 48 relative to the casing in response to changes in the directional heading of the craft will differentially regulate the quantity of air conducted through the flexible conduits in response to suction pressure applied to the ends of the flexible conduits at the rudder assembly 14.

Referring now to FIGS. 7, 8 and 9, it will be noted that the rudder assembly includes a rudder body 66 pivotally mounted on a pivot shaft 68 which is fixedly supported by the brackets 18 and 20. The rudder body, as is well known, has a streamlined cross-sectional shape extending from a leading edge 69 to a trailing edge 70. The rudder body is internally formed with a flow passage arrangement generally referred to by reference numeral 72 and an internal cavity 74 through which the pivot shaft 68 extends. Flow of water through the rudder passage arrangement 72 in response to movement of the craft, provides the motivating energy for operating a turbine wheel 76 mounted about a vertical axis within the downstream exit portion 78 of the rudder passage arrangement. The output shaft 80 of the turbine wheel is drivingly connected by a positive, high reduction gear train 82 to a stationary gear 84 fixed to the pivot shaft 68 as shown in FIG. 7. Accordingly, rotation of the turbine wheel will produce angular displacement of the rudder body 66 about the axis of the pivot shaft 68 in a direction depending upon the direction of rotation of the turbine wheel 76. Operation of the turbine wheel in response to flow of water through the passage arrangement 72 is automatically controlled by the course-directing component 16 as will be hereafter explained.

As more clearly seen in FIG. 8, the rudder passage arrangement 72 includes an inlet portion 86 which converges in a downstream direction to thereby conduct water to a restricted, venturi throat portion 88 during movement of the craft. The flow stream of water enters the inlet portion 86 under a predetermined static pressure which is reduced to a suction pressure value at the throat portion 88. The major portion of the flow stream will then proceed through one of the two channel portions 90 and 92 which diverge in a downstream direction from the throat portion and enter the exit portion 78 at opposite sides of the turbine wheel 76 relative to its rotational axis through the output shaft 80. Thus, by controlling the dynamic pressure of the flow stream applied to the blades of the turbine wheel and by selecting the channel portion through which the flow stream is conducted, the speed and direction of the turbine wheel will be determined. As to the channel portion through which the flow stream is conducted, it will be apparent to those skilled in the art that there is a tendency for the flow stream to adhere to the adjacent surface, this phenomena being known as the "Coanda" effect. Thus, once the flow stream is switched to one of the channel portions 90 and 92, it remains stable as in the case of a fluidic bistable amplifier.

The dynamic pressure of the flow stream impinging on the blades of the turbine wheel and the selection of the channel portion through which the major portion of the flow stream is conducted, is controlled by the introduction of air to the flow stream through the flexible venting conduits 22 and 24. The flexible conduits are respectively connected to vertical passages 94 and 96 extending downwardly from the upper side of the rudder body on either lateral side of the throat portion 88 as more clearly seen in FIGS. 8 and 9. Restricted fluid communication is established between the vertical passages 94 and 96 with the lateral sides of the throat portion 88 by a plurality of orifice passages 98. As a result of this arrangement, differential introduction of air into the flow stream, induced by the suction pressure developed at the venturi throat portion 88, will switch the main portion of the flow stream from one of the diverging channel portions to the other in an efficient manner. Apparently, the introduction of aspirated air into the venturi throat portion from one lateral side of the flow stream interrupts surface adherence in a unique manner to effect channel switching and directional control of the turbine wheel rotation. Further, the introduction of air of considerably less density than the water, produces a fluid mixture having a lower mass density value to thereby reduce the dynamic pressure exerted on the turbine wheel. Thus, the passages may be dimensioned in order to appropriately limit the speed of the turbine wheel in order to obtain a desired amount of corrective angular displacement of the rudder in accordance with directional deviation of the craft from a preset heading as determined by the adjustable positioning of the casing 34 associated with the course directing component 16. Further, flow reducing inserts may be utilized at the inlet portion 86 of the rudder passage so as to accommodate craft having different speed ranges.

In operation, the directional heading of the craft will be maintained by the rudder body 66 in a neutral position. As long as the craft maintains its heading corresponding to a preset, adjusted position of the compass casing 34, both of the flexible conduits 22 and 24 will conduct equal flow rates of a restricted quantity of air to the opposite lateral sides of the throat portion 88 in the rudder passage arrangement. The flow stream will accordingly be split between the diverging channel portions 90 and 92 to thereby apply substantially cancelling torques to the turbine wheel as the flow streams emerge from the exit portion 78. Should the craft deviate from its preset heading, the quantity of air introduced from one lateral side of the flow stream is increased so that any surface adherence of the flow streams in one of the channel portions is interrupted causing substantially all of the water to be conducted through the other of the flow channels. Unidirectional rotation of the turbine wheel 76 ensues producing a corrective angular displacement of the rudder body. The compass casing 34 will then be returned to a flow-blocking position relative to the rotor 48 as the craft is returned to its preset heading. Thus, the course directing component 16 will continuously supply fluid signals through the flexible conduits 22 and 24 to produce switching of the flow stream and corrective displacement of the rudder body.

FIGS. 10 and 11 illustrate a modified form of rudder body 66' which is similar in operation and structure to the previously described rudder 66 except for the rudder passage arrangement. As shown in FIG. 10, the passage arrangement includes a pair of converging inlet portions 100 and 102 disposed on opposite lateral sides of the pivot shaft 68', the inlet portions converging toward two throat portions 104 and 106 with which the flexible conduits 22 and 24 are connected by the vertical passages 94' and 96' as shown in in FIG. 11. When equal, restrictive amounts of air are introduced to the throat portions 104 and 106, the two flow streams impinging on opposite sides of the turbine wheel 76' will apply cancelling torques thereto as the flow streams emerge from the passage exit portion 78'. However, when the flow rate of air introduced to one of the throat portions is increased in response to deviation of the craft from its preset heading, as hereinbefore described, the dynamic pressure of one of the flow streams applied to one side of the turbine wheel will be reduced in view of the reduction in the mass density of this flow stream. The resulting differential torque applied to the turbine wheel will cause rotation thereof in one direction and corrective angular displacement of the rudder body through the reduction gear train 82 as aforementioned. The advantage of the dual venturi throat form of the invention illustrated in FIGS. 10 and 11 resides in the fact that the rudder assembly has a self-correcting attribute. Thus, if the flexible fluid signal conduits 22 and 24 are disconnected from the rudder assembly, it will automatically function to restore the directional heading of the craft if the direction of the craft is changed by operator controlled displacement of the rudder, because one of the inlet portions 100 and 102 would be exposed to a greater dynamic inflow pressure producing corrective rotation of the turbine. This self-correcting feature will also be present when the rudder assembly is sensitive to a magnetic heading through the signal conduits 22 and 24.

Although the automatic pilot system has been described in connection with a marine craft installation wherein air is introduced into a flow stream of water in the venturi flow passage, tests indicate that the system will also operate in a single fluid medium environment such as aircraft or undersea installations. As to the single venturi throat form of the invention shown in FIGS. 8 and 9, a negative pressure signal from course directing component 16 effects channel switching in the single fluid medium environment. Conceivably, a positive pressure signal could also be utilized to effect channel switching in this form of the invention.

What I claim as new is as follows:

1. An automatic pilot for a craft moving through a fluid medium comprising fluid-actuated means for controlling the direction of movement of the craft through said fluid medium, passage means for conducting said fluid medium to the fluid actuated means to actuate the same in response to said movement of the craft, directional sensing means for detecting deviations of the craft from a preset course, differential venting means connecting the passage means to the directional sensing means for continuously controlling operation of the fluid-actuated means in accordance with said deviations in the course of the craft, and a rudder pivotally mounted by the craft, and a rudder pivotally mounted by the craft through which the passage means extends, said fluid-actuated means including a turbine wheel directionally driven by the fluid medium conducted thereto by the passage means and gear means connected to the turbine wheel for angularly displacing the rudder relative to the craft in response to rotation of the turbine wheel.

2. The combination of claim 1 wherein said passage means includes two channel portions respectively conducting flow streams of said fluid medium to opposite sides of the turbine wheel, said differential venting means being operative to vary the relative dynamic pressures exerted by said flow streams on the opposite sides of the turbine wheel.

3. The combination of claim 2 wherein said passage means further includes a convergent inlet portion through which the fluid medium enters and a throat portion connecting the inlet portion to said two channel portions, said venting means being connected to the throat portion for restrictively connecting the same to atmosphere.

4. The combination of claim 3 wherein said venting means includes a pair of conduits connected to the directional sensing means, and orifice means connecting each of said conduits to the throat portion on opposite transverse sides of said flow streams for introducing air to the flow streams.

5. The combination of claim 4 wherein said directional sensing means includes an angularly adjustable casing, a compass rotor and a spindle rotatably mounting the rotor within the casing, said venting means further including separate passages formed between the rotor and the casing in fluid communication with said conduits, and an atmospheric valve passage formed in the rotor and the spindle, said rotor being angularly displaceable from a passage blocking position in opposite directions relative to the casing establishing fluid communication between the valve passage and one of the separate passages.

6. In combination with a fluid-actuated device, a rudder having an inlet portion through which a fluid medium is conducted, a pair of diverging channel portions conducting a flow stream of the fluid medium to the fluid-actuated device and a venturi throat portion connecting the inlet portion to said diverging channel portions, a source of fluid of lower density than said fluid medium, orifice passage means for introducing said fluid from the source to the throat portion from opposite directions laterally of the flow stream, and control means connected to the orifice passage means for directionally varying the flow rate of fluid laterally introduced into the throat portion to control displacement of the flow stream from one of the channel portions to the other of the channel portions.

7. The combination of claim 6 wherein said control means comprises a magnetic compass and valve means actuated by the compass.

8. The combination of claim 7 wherein said source of fluid is the atmosphere.